Sept. 13, 1932.  J. E. RIGHTMIRE  1,877,201
VEHICLE
Filed Nov. 11, 1930    2 Sheets-Sheet 2
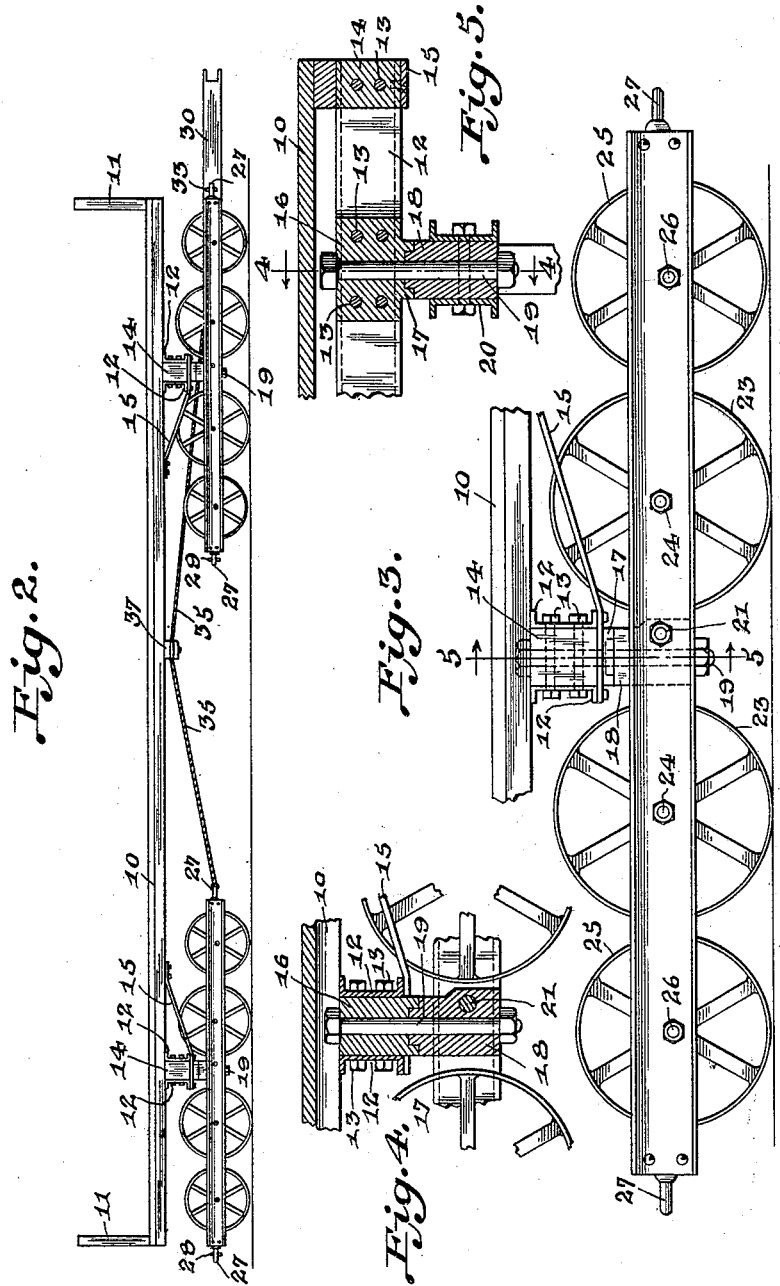
Inventor
J. E. Rightmire,
By Wilkinson Mawhinney
Attorneys Patented Sept. 13, 1932

1,877,201

UNITED STATES PATENT OFFICE

JOHN E. RIGHTMIRE, OF YAKIMA, WASHINGTON

VEHICLE

Application filed November 11, 1930. Serial No. 494,950.

The present invention relates to vehicles, and more particularly to a truck or wagon.

An object of the present invention is to provide a truck adapted particularly for conveying fruit and other products smoothly over rough ground, and to also facilitate the turning of the truck or vehicle in narrow and confined places.

In certain sections of the country orchards are irrigated through ditches which are disposed between the rows of trees, and these ditches are relatively narrow and deep and several of these ditches are disposed between the rows of trees. In transporting fruit from the places where it has been picked, it is necessary to use orchard trucks or sleds. If trucks with wheels are used they jar in passing over the ditches and cause considerable damage to the fruit.

Another object of the present invention is to provide a truck structure which has wheels peculiarly arranged as to their relative sizes and locations, and which are also peculiarly mounted on the truck to prevent the jarring or bumping of the truck across the irrigation ditches, or other rough and uneven ground and to thus prevent shock and jar to the fruit or other products and the like which may be carried on the truck.

Another important feature of the present invention is to provide a truck structure embodying the above characteristics and which at the same time may be maintained relatively light in weight, strong and durable, and which at the same time embodies but relatively few parts producing a relatively simple construction.

With the foregoing and other objects in view, the invention will be more fully described hereinafter, and will be more particularly pointed out in the claim appended hereto.

In the drawings, wherein like symbols refer to like or corresponding parts throughout the several views.

Figure 2 is a side elevation of the same.

Figure 3 is a fragmentary enlarged view of one of the wheel frames and its connection to the truck body.

Figure 4 is a longitudinal section taken through the pivotal connection of the wheel frame with the truck body substantially on the line 4—4 of Figure 5, and Figure 5 is a transverse section therethrough taken substantially on the line 5—5 of Figure 3.

Figure 1:
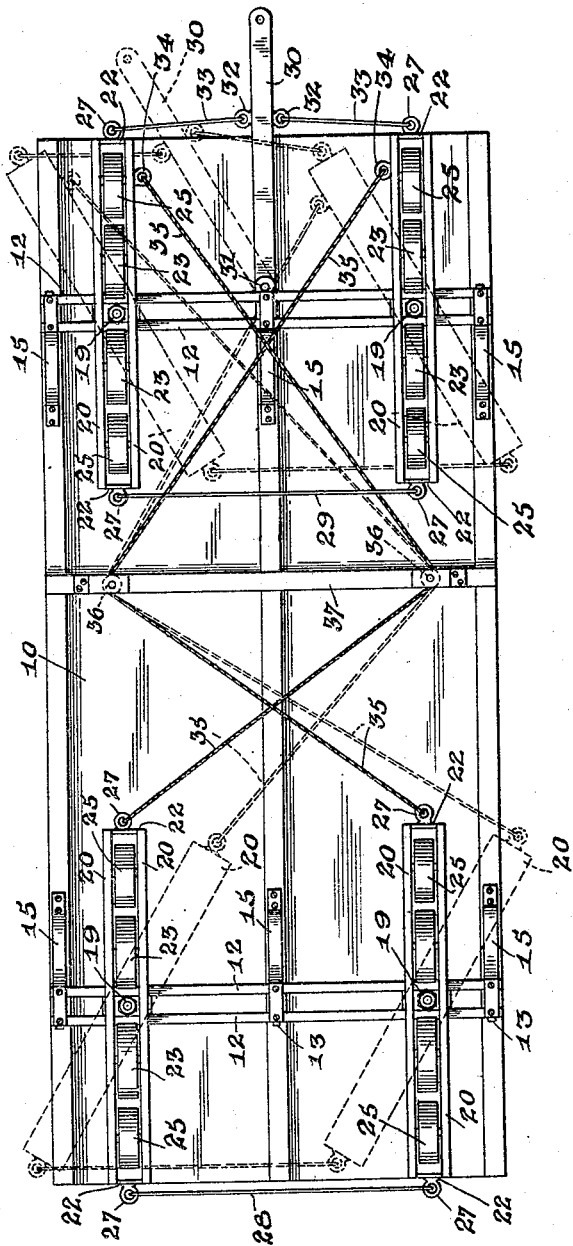
Figure 1 is a bottom plan view of an orchard truck constructed according to the present invention, the dotted lines showing different positions of the wheels for short turning of the truck.

Referring to the drawings, 10 designates a truck body which in the present instance is disclosed in the form of a platform provided with spaced longitudinal sills for reinforcement and which is provided at opposite ends with upstanding posts 11 or the like for holding the products or material to be carried.

The truck body 10 is provided across its under side and near each end with a bolster, and each bolster may comprise a pair of channel irons 12 which are secured by bolts 13 or the like against the opposite sides of spacers 14 which are disposed at the opposite edge portions of the truck body 10 as may be best shown in Figure 5. The spacers 14 are suitably secured to the truck body 10 and may also be used intermediate the lateral edges of the body wherever the longitudinal sills are disposed.

In order to hold the bolsters rigidly beneath the truck body, braces 15 are employed which at their lower ends are secured across the lower edges of the bolsters by screws or the like and which extend upwardly and inwardly from the bolsters and are suitably secured at their upper ends to the sills of the truck body 10 at points spaced inwardly from the bolsters. Any additional bracing means may be employed but the braces 15 are thought sufficient to withstand the tortional strain imposed on the bolsters.

Each bolster is provided, between the channel irons 12 thereof and at points spaced inwardly a short distance from the opposite sides of the truck body, with a bearing block 16 secured by bolts or the like in the manner of the spacers 14 and which is provided with a depending annular projection 17 suitably recessed to provide a circular bearing adapted to receive in interfitting engagement therewith the correspondingly formed upper end of an adjacent sleeve 18 adapted to turn upon the bearing 17.

A pivot bolt or king pin 19 is secured through the registering bearing block 16 and sleeve 18 for holding these parts together and admitting of the turning of the sleeve freely about the axis of the bolt. Each sleeve 18 is mounted in a wheel frame, and each frame comprises a pair of spaced apart side rails 20 secured to the opposite flat faces of the sleeve 18 by means of a clamping bolt 21.

The opposite ends of each wheel frame are provided with cross pieces 22 suitably riveted to the side rails 20 for holding the same in spaced apart relation and for interbracing the wheel frame. Each wheel frame is provided at opposite sides of and adjacent to the bearing sleeve 18 with a pair of relatively large wheels 23 mounted on axle bolts 24 adapted to normally engage the ground and support the wheel frame.

In the outer ends of each wheel frame is disposed a pair of relatively small wheels 25 mounted on axle bolts 26 which are adapted to engage the ground when the larger wheels 23 drop into ditches, ruts or other depressions in the ground surface so that the wheel frame will be supported against sinking or dropping to any appreciable extent beneath the general surface level of the ground, and thus the frame will be maintained against sudden and uneven vertical movement.

Mounted on the opposite ends of each wheel frame is an eye piece 27, or the like by means of which the several frames used may be interconnected. At the rear end of the truck the rear end of the wheel frames are interconnected by a tie rod 28 which is pivotally secured at opposite ends to the respective eye pieces 27 for holding the rear wheel frames in substantially parallel relation with respect to each other, and a second tie rod 29 is similarly connected to the rear ends of the forward wheel frames for holding them in relative parallel relation.

A draft bar 30 of any suitable construction is connected by a pivot bolt 31 to an intermediate portion of the forward bolster of the truck and extends forwardly therefrom a suitable distance beyond the body portion 10 for engagement with a suitable draft device so that the truck may be drawn forwardly by horses, any suitable draft animal, a tractor or the like.

The draft bar 30 is provided at opposite sides and substantially in line with the forward end of the truck body 10 with oppositely extending eye pieces 32 for receiving the inner ends of connecting rods 33 which at their outer ends are secured to the forward eye pieces 27 of the front wheel frames and are adapted to co-operate with the rear tie rod 29 for holding the front wheel frames in substantially parallel relation at all times.

The forward ends of the front wheel frames are also provided with inwardly extending eye pieces 34 to which are connected the forward ends of flexible coupling elements 35, such as cables, chains or the like and these coupling elements are arranged in crossed relation and are carried backwardly and about pulleys 36 mounted upon the underside of the body portion 10 intermediate the front and rear ends thereof. Preferably the body portion 10 is provided with a cross sill 37 at its intermediate point which not only reinforces the body 10 but also serves as a suitable support for the pulleys 36. The flexible elements 35 are carried rearwardly from the pulleys 36 and are again disposed in crossed relation and are secured to the eye pieces 37 at the forward ends of the rear wheel frames. The flexible elements 35 are secured in relatively taut position so that swinging movements of the front wheel frames are communicated correspondingly and equally to the rear wheel frames as clearly shown by the dotted lines in Figure 1.

From the above, the operation of the truck will be apparent for as it is drawn forwardly in a straight line the tie rods 28 and 29, the connecting rods 33, and the flexible elements 35 maintain the front and rear wheel frames in substantially parallel relation in pairs and in true parallel relation with the longitudinal axis of the truck. When the truck is drawn over ditches or over uneven ground, the large wheels 23, normally supporting the truck, are permitted to drop one at a time in the ditches or depressions in the ground surface and bring into operative position the smaller wheels 25 incident to the swinging of the wheel frames upon the horizontal pivot bolts 21. Thus, the wheel frames are not permitted to drop to any appreciable extent and the smaller wheels 25 are of such diameter as compared with that of the larger wheels 23 that but a slight depression in the ground surface will bring the smaller wheels into operation.

The wheel frames thus not only have a movement about their vertical pivots 19 but also have a movement about their horizontal pivots 21 and thus by the particular arrangement of the wheels 23 and 25 undulations in the surface of the ground are not communicated to any appreciable extent to the truck body 10.

When a change of direction is desired, the draft bar or tongue 30 is swung to one side in the natural movement of turning, such as shown in Figure 1. This action, through the short connecting rods 33 swings the forward wheel frames about their vertical axes 19, and these wheel frames are maintained in parallel relation not only by the rods 33 but also by the tie rod 29.

Through the action of the flexible connectors 35, the rear wheel frames are swung about their pivotal axes 19 in a reverse direction but to the same extent so that while the angles of deflection of the front and rear vehicle frames are identical, their movements are opposite. The result obtained is that the truck may be turned on a short radius and may thus be easily conducted through narrow places, between trees and the like. Thus a relatively long truck may be easily handled in a narrow space and about sharp turns.

It will be appreciated that the device is low for easy loading, and at the same time easily slips under the branches of the trees without damage to the fruit or branches.

All of the bolts may be shouldered at opposite ends. When the flat sides of the bolts at wheel frame have been tightened with nuts, there is additional strength given to the wheel frame. Furthermore, each bolt or axle has roller bearings which reduces the friction and is especially desirable for carrying heavy loads.

Referring to the arrangement of the sixteen wheel surface contact, such arrangement will pull or draw more weight with less horse power than heretofore possible with trucks now in use.

It is obvious that various changes and modifications may be made in the details of construction and design of the above specifically described embodiment of this invention without departing from the spirit thereof, such changes and modifications being restricted only by the scope of the following claim.

What is claimed is:—

A truck comprising a body portion, pairs of front and rear transverse beams secured in spaced apart parallel relation across the under side of the body portion, pivot blocks secured between said pairs of beams adjacent the front and rear corners of the body portion, and connected wheeled frames carried beneath the front and rear corner portions of the body portion and each comprising a pair of spaced apart parallel beams, a bearing block secured between the intermediate portions of the pair of beams adapted to register with the bearing blocks of the body portion, a king pin connecting said bearing blocks together in superposed relation, and a plurality of wheels mounted between the parallel beams for supporting the same.

JOHN E. RIGHTMIRE.